United States Patent [19]
Murayama

[11] Patent Number: 5,316,460
[45] Date of Patent: May 31, 1994

[54] SYNTHETIC RESIN MATERIAL FEEDING APPARATUS AND SEALING LINER FORMING SYSTEM

[75] Inventor: Kashiwa Murayama, Fujisawa, Japan

[73] Assignee: Japan Crown Cork Co., Ltd., Tokyo, Japan

[21] Appl. No.: 976,422

[22] Filed: Nov. 13, 1992

[30] Foreign Application Priority Data

Dec. 6, 1991 [JP] Japan ................................. 3-323250

[51] Int. Cl.⁵ .............................................. B29C 45/14
[52] U.S. Cl. ...................................... 425/110; 74/117; 425/382.3; 425/809
[58] Field of Search .................... 74/117, 118, 142; 425/110, 127, 204, 215, 809, 382.3; 366/79, 96

[56] References Cited

U.S. PATENT DOCUMENTS

| | | | |
|---|---|---|---|
| 3,213,697 | 10/1965 | Hartmann et al. | 74/117 |
| 3,415,134 | 12/1968 | Nittka | 74/117 |
| 3,890,926 | 6/1975 | Teed | 118/411 |
| 4,041,787 | 8/1977 | Brundler | 74/117 |
| 4,402,901 | 9/1983 | Emura et al. | 264/294 |
| 4,412,797 | 11/1983 | Murayama | 425/114 |
| 4,501,498 | 2/1985 | McKelvey | 425/204 |
| 4,776,782 | 10/1988 | Murayama et al. | 425/809 |
| 4,882,185 | 11/1989 | Simelunas et al. | 425/311 |

FOREIGN PATENT DOCUMENTS 162456 11/1985 European Pat. Off. .
1054451 1/1967 United Kingdom .

*Primary Examiner*—Jay H. Woo
*Assistant Examiner*—Robert B. Davis
*Attorney, Agent, or Firm*—Beveridge, DeGrandi, Weilacher & Young

[57] ABSTRACT

A synthetic resin material feeding apparatus, for use in a system for forming a sealing liner on the inner surface of a top panel wall of container closure shell, has an extruder and a gear pump. The driving mechanisms of the extruder and the gear pump have an intermittent rotation-driving output for intermittently operating the extruder and the gear pump.

18 Claims, 4 Drawing Sheets

INTERMITTENT
OPERATION OF
THE EXTRUDER

INTERMITTENT
OPERATION OF
THE GEAR PUMP

INTERMITTENT
ROTATION OF
THE TURRET

SYNTHETIC RESIN MATERIAL FEEDING APPARATUS AND SEALING LINER FORMING SYSTEM

FIELD OF THE INVENTION

This invention relates to a synthetic resin material feeding apparatus for feeding a synthetic resin material intermittently, and a sealing liner forming system for forming a synthetic resin sealing liner on the inner surface of a top panel wall of a container closure shell by utilizing such a synthetic resin material feeding apparatus.

DESCRIPTION OF THE PRIOR ART

A container closure for a container such as a drinking bottle is usually composed of a container closure shell formed from a suitable metallic thin plate or a synthetic resin and a synthetic resin sealing liner applied to the inner surface of a top panel wall of this container closure shell. The sealing liner of a synthetic resin is conveniently formed by feeding a synthetic resin material in a softened molten state (hereinafter sometimes referred to as a softened molten synthetic resin material) onto the inner surface of a top panel wall of the container closure shell and compression-molding the synthetic resin material into a required shape. The synthetic resin material in the softened molten state to be compression-molded can be fed by properly cutting the softened molten synthetic resin extruded from an extruder and carrying the cut resin to the inner surface of a top panel wall of the container closure shell. The prior literatures disclosing typical examples of the synthetic resin material feeding apparatus include Japanese Laid-Open Patent Publication No. 110176/1977, Japanese Laid-Open Patent Publication No. 89,583/1978, Japanese Laid-Open Patent Publication No. 77,523/1980 and Japanese Laid-Open Patent Publication No. 105,613/1987.

In the conventional synthetic resin material feeding apparatus, especially when a softened molten synthetic resin material is fed in a annular form to the inner surface of a top panel wall of the container closure to be intermittently delivered through a synthetic resin material feeding zone, it is difficult to feed the synthetic resin material as required, more specifically to feed the synthetic resin material in the softened molten state as required in a sufficiently precisely controlled feed amount to a required position of the inner surface of a top panel wall of the container closure shell in a fully uniform state. Therefore, in the synthetic resin sealing liner forming system in which the conventional synthetic resin material feeding apparatus is used, a synthetic resin sealing liner cannot be formed as required fully stably.

SUMMARY OF THE INVENTION

It is an object of this invention to improve the synthetic resin material feeding apparatus and to feed the softened molten synthetic resin material as required in a sufficiently precisely controlled feed amount and in a fully uniform state, even when the softened molten synthetic resin material is fed in an annular form to the inner surface of a top panel wall of the container closure shell to be intermittently delivered through a synthetic resin material feeding zone.

It is another object of the invention to utilize a synthetic resin material feeding apparatus which can feed a softened molten synthetic resin material as required in a sufficiently precisely controlled feed amount and in a fully uniform state, even when the softened molten synthetic resin material is fed in an annular form to the inner surface of a top panel wall of the container closure shell to be intermittently delivered through a synthetic resin material feeding zone, whereby there is provided an improved sealing liner forming system for stably forming a synthetic resin sealing liner as required on the inner surface of the top panel wall of the container closure shell.

Having taken notice of the fact that in spite of the feeding of a synthetic resin material to a container closure shell or the like intermittently, a rotating screw of an extruder is continuously rotated in a conventional synthetic resin material feeding apparatus, and the softened molten synthetic resin material is continuously extruded from a extruder the present inventors have found that the above technical problem can be solved by making an improvement so that the extrusion of the synthetic resin material in the softened molten state from the extruder may be intermittently carried out by rotating the rotating screw of the extruder intermittently.

That is, according to this invention, there is provided, as a synthetic resin material feeding apparatus for solving the above technical problem, a synthetic resin material feeding apparatus which is equipped with an extruder for extruding a synthetic resin material in the softened molten state and an extruder driving mechanism for rotating the rotating screw of the extruder, wherein the extruder driving mechanism has an intermittent rotation-driving function and rotates the rotating screw intermittently.

According to this invention, there is further provided, as a sealing liner forming system for solving the above technical problem, a sealing liner forming system comprising a container closure shell conveying means for intermittently conveying a container closure shell to be formed a synthetic resin sealing liner onto the inner surface of its top panel wall through a synthetic resin material feeding zone and a synthetic resin material molding zone; a synthetic resin material feeding apparatus for feeding a synthetic resin material in the softened molten state to the inner surface of a top panel wall of the container closure shell in the synthetic resin material feeding zone; and a molding apparatus for molding the synthetic resin material present in the inner surface of the top panel wall of the container closure shell into a sealing liner in the synthetic resin material molding zone, the synthetic resin material feeding apparatus being provided with an extruder for extruding the softened molten synthetic resin material and an extruder driving mechanism for rotating the rotating screw of the extruder, wherein said extruder driving mechanism has an intermittent rotation-driving function, and rotates the rotating screw intermittently.

In the synthetic resin material feeding apparatus of this invention, the rotating screw of the extruder is intermittently rotated in correspondence with the intermittent feeding of a synthetic resin material. Therefore, the extrusion of the softened molten synthetic material from the extruder and the transfer of the extruded synthetic material to a required position can be matched without compulsion. Accordingly, even when the softened molten synthetic resin material is fed in an annular form to the inner surface of the top panel wall of the container closure intermittently through the synthetic resin material feeding zone, the softened molten synthetic resin material can be fed as required in a sufficiently precisely controlled amount and in a fully uniform state. Furthermore, in the sealing liner forming system of this invention, even when the softened molten synthetic resin material is fed in an annular form on the inner surface of the top panel wall of the container closure conveyed intermittently through the synthetic resin material feeding zone, a synthetic resin sealing liner as required can be stably formed in the inner surface of the top panel wall of the container closure shell, because the synthetic resin feeding apparatus capable of feeding a softened molten synthetic resin material as required in a fully precisely controlled feed amount with a fully uniform state is utilized.

DETAILED DESCRIPTION OF PREFERRED EMBODIMENTS

Figure 1:
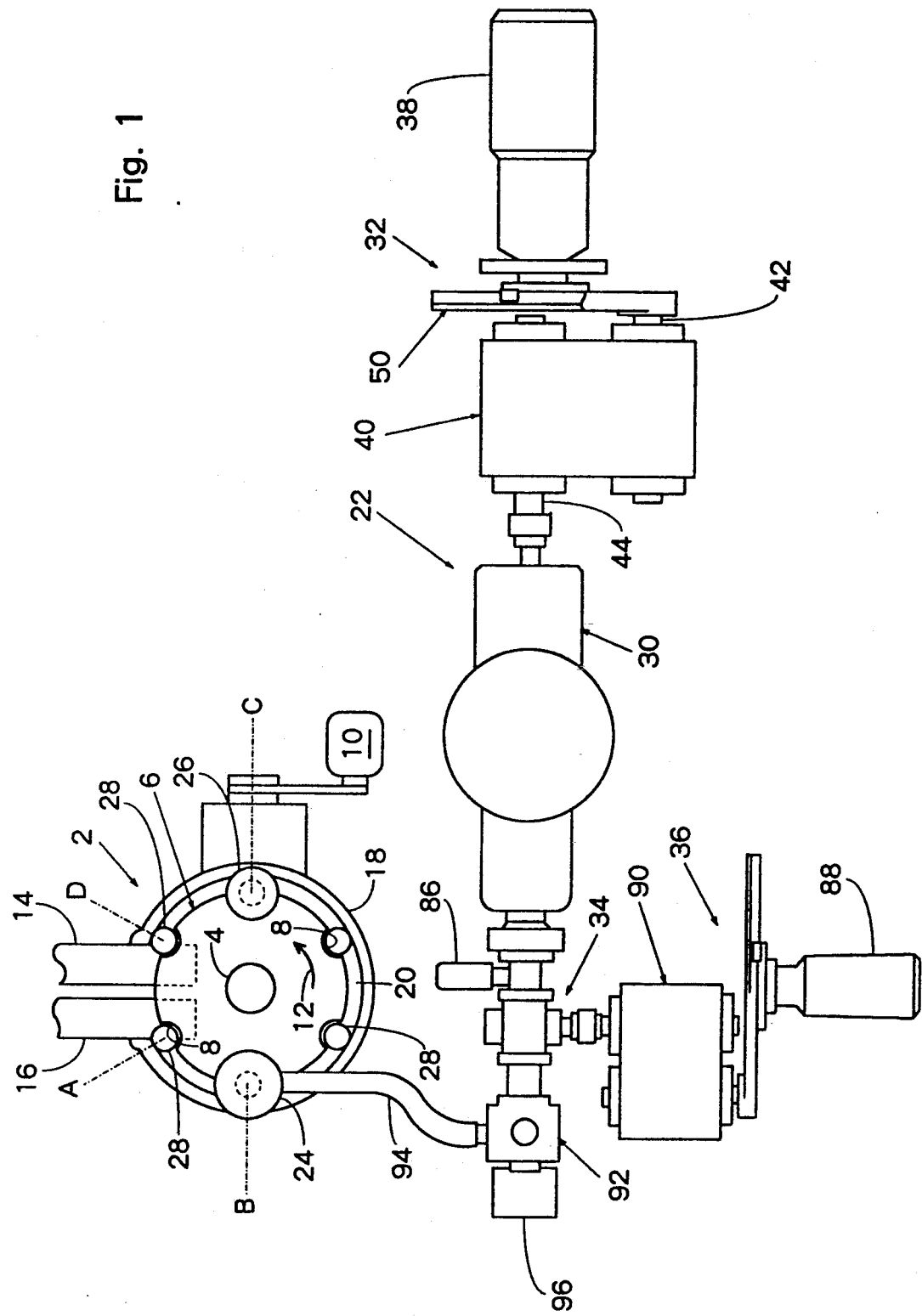
FIG. 1 is a simplified top plan view showing a preferred example of the sealing liner forming system constructed in accordance with this invention.

FIG. 1 briefly depicts a sealing liner forming system, constructed in accordance with this invention, for feeding a softened molten synthetic resin material to the inner surface of the top panel wall of the container closure shell and molding the synthetic resin material into a sealing liner of a required shape. This sealing liner forming system is provided with a container closure shell conveying means 2. The illustrated container closure shell conveying means 2 includes an intermittently rotating turret 6 mounted rotatably on a supporting shaft 4 extending substantially vertically (in a direction perpendicular to the sheet surface in FIG. 1). Six accommodating pockets 8 are formed on the peripheral edge of the turret 6 at equiangular intervals. Each of the accommodating pockets 8 is of a hemispherical form being radially outwardly open. The turret 6 is drivingly connected to a rotating driving source 10 which may be an electric motor via a suitable transmission means (not shown), and intermittently rotated every 60° in the direction shown by an arrow 12 by the driving source 10. The intermittent rotation of the turret 6 can be realized by using, as the driving source 10 an electric motor having an intermittent rotating function such as a stepping motor, or by interposing a suitable intermittent transmission means, which may be substantially the same as the later-described intermittent transmission means, between the driving source 10 and the turret 6. By the intermittent rotation of the turret 6, the accommodating pockets 8 are intermittently moved via a container closure shell introducing zone A, a synthetic resin material feeding zone B, a synthetic resin material molding zone C and a container closure shell delivering zone D. Between the container closure shell delivering zone D and the container closure shell introducing zone A, a container closure shell delivering means 14 and a container closure shell introducing means 16 are disposed. Outside the turret 6, a stationary arcuate rail 18 is disposed which extends from the introducing zone A to the delivering zone D along the peripheral edge of the turret 6 in the intermittent rotating direction shown by the arrow 12. A annular supporting bottom plate 20 is disposed below the turret 6. In the synthetic resin material feeding zone B, a synthetic resin material cutting and transferring mechanism 24 of a synthetic resin material feeding apparatus generally shown by a numeral 22 is disposed. A synthetic resin material molding apparatus 26 is disposed in the synthetic resin material molding zone C. While the accommodating pockets 8 are moved from the container closure shell delivering zone D to the container closure shell carry-in zone A by the intermittent rotation of the turret 6, the container closure shell 28 in which the synthetic resin liner has been formed in the inner surface of the top panel wall is delivered from the accommodating pockets 8 to the container closure shell delivering means 14, and the container closure shell 28 in which the synthetic liner to be formed in the inner surface of the top panel wall is carried to the accommodating pockets 8 from the container closure shell introducing means 16 in an inverted state with the inner surface of the top panel wall directed upwardly. While the accommodating pockets 8 are intermittently moved from the container closure shell introducing zone A to the container shell delivering zone D in the direction shown by the arrow 12, the container closure shell 28 carried into the accommodating pockets 8 is prevented from escaping to the under portion by the annular supporting bottom plate 20 disposed below the turret 6, and is prevented from dropping radially outwardly by the arcuate rail 18. Thus, the container closure shell 28 accommodated in the accommodating pocket 8 is intermittently moved correspondingly to the intermittent movement of the accommodating pockets 8. In the synthetic resin material feeding zone B, the softened molten synthetic resin material is fed into the inner surface of a top panel wall of the container closure shell 28, e.g., extending in an annular form on the peripheral portion of the inner surface of the top panel wall, by the action of the synthetic resin material cutting and transferring mechanism 24. In the container closure shell molding zone C, the synthetic resin material present in the inner surface of the top panel wall of the container closure shell 28 is compression-molded into a sealing liner of a required shape by the action of the synthetic resin material molding apparatus 26.

By the way, in the illustrated sealing liner forming system, the construction other than the synthetic resin material feeding apparatus 22 does not constitute the novel features improved in accordance with the present invention and may be forms known to those skilled in the art. Hence, a detailed description thereof will be omitted in this specification.

With reference to FIG. 1, the illustrated synthetic resin material feeding apparatus shown generally by a reference numeral 22 includes an extruder 30, an extruder driving mechanism 32, a gear pump 34, and a gear pump driving mechanism 36 in addition to the synthetic resin material cutting and transferring mechanism 24. The extruder 30 of a known form (for example, it may be a single screw extruder sold under the tradename "MS series" by I. K. G. Co. Ltd.) has a rotating screw which is intermittently rotated by the extruder driving mechanism 32. The extruder driving mechanism 32 includes a driving source 38 which may be an electric motor and an intermittent transmission means 40 to convert a continuous rotating output into an intermittent rotation, and the intermittent rotating output of the intermittent transmission means 40 is transmitted to the rotating screw of the extruder 30.

Figure 2:
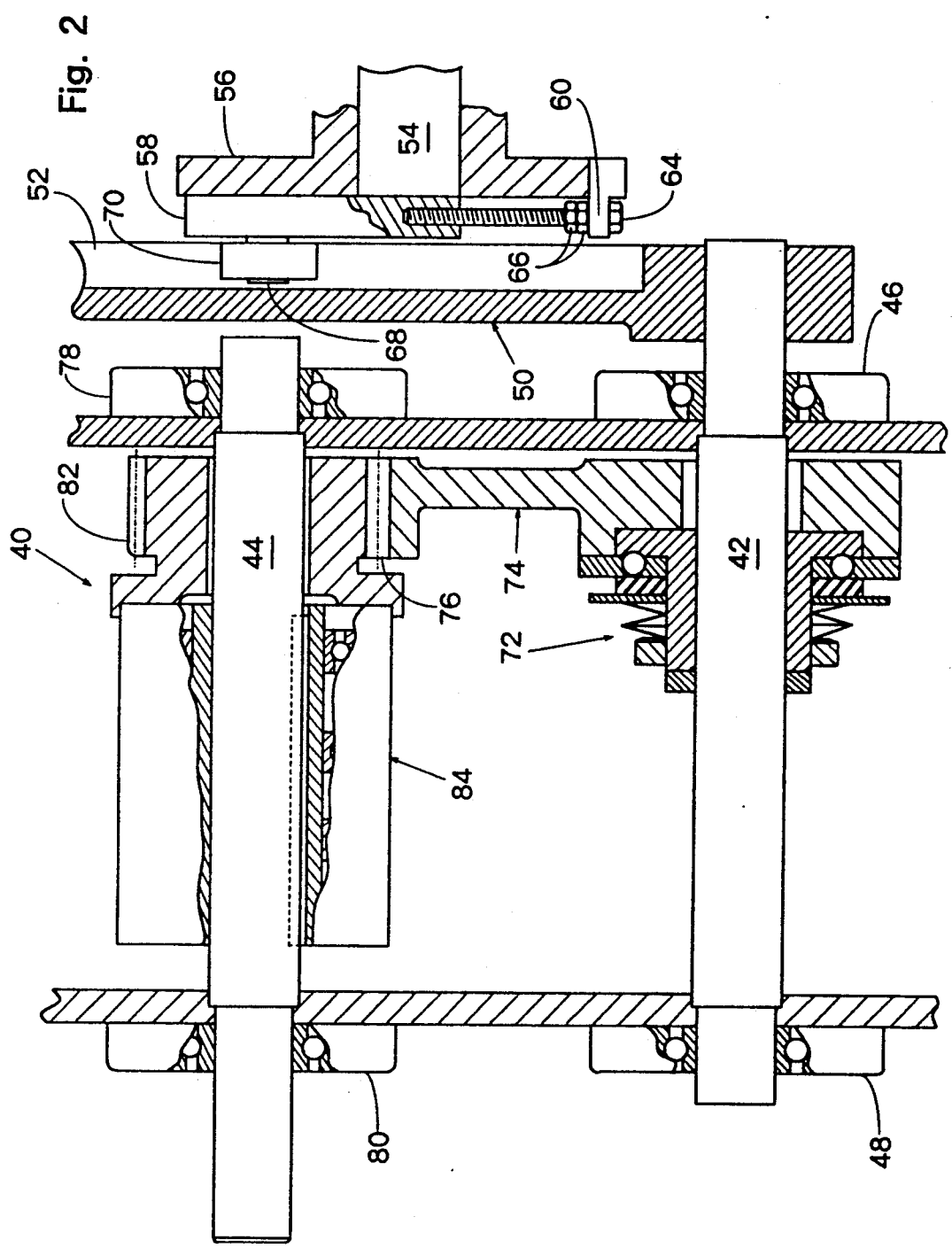
FIG. 2 is a sectional view showing an intermittent transmission means of an extruder driving mechanism in a synthetic resin material feeding apparatus used in the sealing liner forming system shown in FIG. 1.
Figure 3:
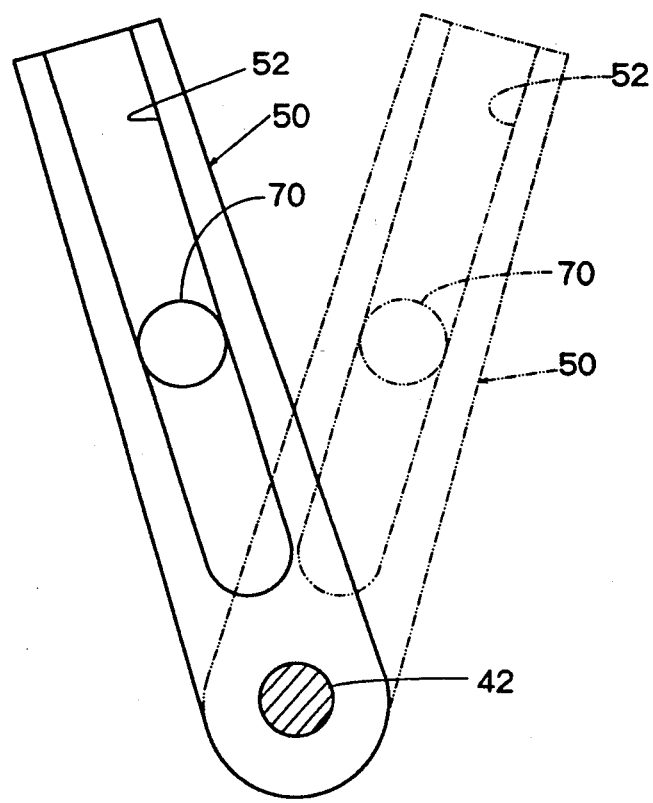
FIG. 3 is a simplified partial view showing a crank arm and its related constituent elements in the intermittent transmission means shown in FIG. 2.

With reference to FIGS. 1 and 2, the intermittent transmission means 40 has an input shaft 42 and an output shaft 44 extending in parallel with each other and spaced from each other. The input shaft 42 is rotatably mounted on a pair of stationary bearing means 46 and 48 disposed at an interval in an axial direction. One end portion of a crank arm 50 is fixed to one end portion (in FIG. 2, the right end portion) of the input shaft 42. An elongate groove 52 extending in a direction perpendicular to the input shaft 42 is formed longitudinally in a crank arm 50 perpendicularly extending to the input shaft 42 (see FIG. 3 also). On the other hand, a supporting circular plate 56 is fixed to the top end portion of an output shaft 54 of the driving source 38. A guide groove (not shown) extending diametrically in the front surface of the supporting circular plate 56 is formed, and an adjusting member 58 is slidably mounted on this guide groove. A projecting piece 60 protruding forwards is fixed to the supporting circular plate 56, and a through-hole extending diametrically is formed in the projecting piece 60. The shaft of an adjusting screw 64 is inserted into the through-hole. The adjusting member 58 has a female screw hole extending in a diametrical direction of the supporting circular plate 56, and the shaft of an adjusting screw 64 is screwably fitted in the female screw hole. Loosening-preventing nuts 66 are also screwed into the adjusting screw 64. Thus, by the clamping action of the adjusting screw 64 and the nut 66, the adjusting member 58 is fixed to the supporting circular plate 56 adjustably at an optional position in a diametrical direction. A forwardly projecting shaft 68 is fixed to the adjusting member 58, and a roller 70 is rotatably mounted on a supporting shaft 68. The central axes of the supporting shaft 68 and the roller 70 mounted thereon are eccentric to the central axis of the output shaft 54 of the driving source 38. The eccentric distance of the supporting shaft 68 and the roller 70 to the output shaft 54 can be properly adjusted by loosening the nut 66 and varying the screwed degree of the adjusting screw 64 to the screw hole of the adjusting member 58. The roller 70 is accommodated in the groove 52 formed in the crank arm 50. The outside diameter of the roller 70 is made substantially the same as the width of the groove 52. When the output shaft 54 of the driving source 38 is continuously rotated clockwise in FIG. 3, the continuous rotation of the output shaft 54 is transmitted to the crank arm 50 via the roller 70 which slidably moves relatively to the groove 52 of the crank arm 50, and the crank arm 50 is continuously reciprocatingly swivelled between an angular position shown by a solid line and an angular position shown by a two-dotted chain line shown in FIG. 3. Hence, the input shaft 42 of the intermittent transmission means 40 is reciprocatingly rotated along a predetermined angular range. As can be easily understood by referring to FIG. 3, the reciprocatingly swivelling angle of the crank arm 50 and accordingly the reciprocatingly rotating angle of the input shaft 42 of the intermittent transmission means 40 can be adjusted by adjusting the eccentric distance of the roller 70 to the output shaft 54 of the rotating driving source 38.

Figure 4:
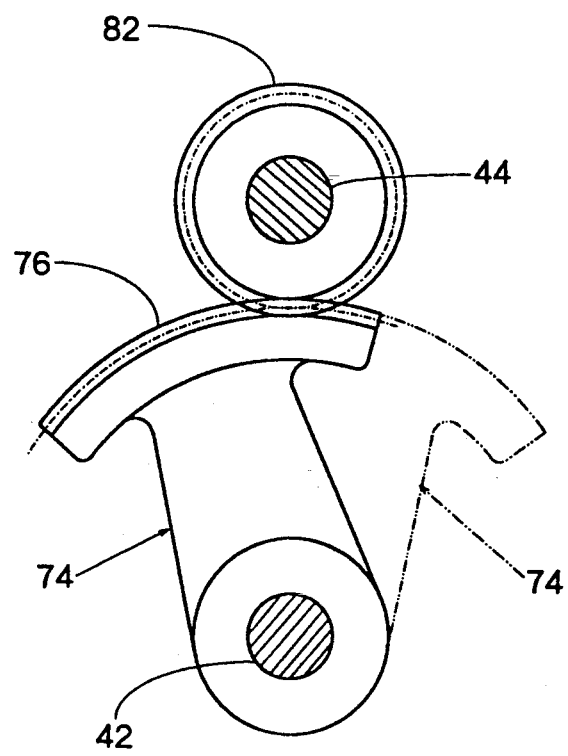
FIG. 4 is a simplified partial view showing a transmission arm and its related constituent elements in the intermittent transmission means shown in FIG. 2.

With reference to FIG. 2, a transmission arm 74 is secured to the input shaft 42 of the intermittent transmission means 40 through a torque limiter 72. The torque limiter 72 for limiting a transmission torque to not more than a predetermined value may be of a known form. For example, "Torque Guard" sold under this tradename by Tsubakimoto Chain Co. may conveniently be used. With reference to FIG. 2 and FIG. 4, the transmission arm 74 has an arm extending perpendicularly to the input shaft 42. The end portion of this arm is arcuate, and teeth 76 are provided in the outside circumferential surface of the arcuate end portion.

The output shaft 44 of the intermittent transmission means 40 is rotatably mounted on a pair of stationary bearing means 78 and 80 spaced axially. A gear 82 is rotatably mounted on the output shaft 44, and the teeth 76 provided on the outer circumferential surface of the arcuate end portion of the transmission arm 74 is brought into engagement with the gear 82. A one-way clutch 84 is also mounted on the output shaft 44, and the gear 82 is connected to the output shaft 44 via the one-way clutch 84. When the gear 82 is rotated clockwise in FIG. 4 the rotation of the gear 82 is transmitted to the output shaft 44 via the one-way clutch 84. But when the gear 82 is rotated counterclockwise in FIG. 4, the rotation of the gear 82 is not transmitted to the output shaft 44. The one-way clutch 84 may be of a known form. For example, a product sold under the tradename "One-Way Clutch PHC" by Nippon Seiko K.K. may be conveniently used. The forward end (the left end portion in FIG. 2) of the output shaft 44 of the intermittent transmission means 40 is connected to the rotating screw of the extruder 30 via a suitable joint means (not shown).

When the rotating driving source 38 is energized to rotate the output shaft 54 continuously in a predetermined direction the rotation of the output shaft 54 is transmitted to the crank arm 50 of the intermittent transmission means 40 through the roller 70 thereby to reciprocatingly swivel the crank arm 50 and the input shaft 42 to which the crank arm 50 is secured is reciprocatingly rotated. The reciprocating rotation of the input shaft 42 is transmitted to the gear 82 mounted on the output shaft 44, via the transmission arm 74 fixed to the input shaft 42, whereby the gear 82 is reciprocatingly rotated. When the gear 82 is rotated in a predetermined direction, i.e., clockwise in FIG. 4 the rotation of the gear 82 is transmitted to the output shaft 44 via the one-way clutch 84. But when the gear 82 is rotated in an opposite direction, i.e., counterclockwise in FIG. 4, the rotation of the gear 82 is not transmitted to the output shaft 44. Thus, the output shaft 44 of the intermittent transmission means 40 is intermittently rotated in a predetermined direction, and accordingly, the rotating screw of the extruder 30 is rotated intermittently in a predetermined direction. The intermittent rotation angle (one rotation angle) of the rotating screw of the extruder 30 may be adjusted by modifying the fixing position of the adjusting member 58 to adjust the eccentric distance of the roller 70 to the output shaft 54 of the driving source 38. When an excessive resistance acts on the rotating screw of the extruder 30, a slippage is produced between the input shaft 42 and the transmission arm 74 by the action of the torque limiter 72.

With reference to FIG. 1, the description will be continued. An extrusion opening of the extruder 30 is connected to the inlet of the gear pump 34 via an accumulator 86. The rotating gear pair of the gear pump 34 which may be of a known type (for example, a gear pump sold under the tradename "HF Series" by Kawasaki Heavy Industries Ltd.) is rotated by the gear pump driving mechanism 36. The gear pump driving mechanism 36, as the case of the extruder driving mechanism 32, may include a rotating driving source 88 which may be an electric motor and an intermittent transmission means 90 for converting the continuous rotating output of the driving source 88 to an intermittent rotation. The construction of the intermittent transmission means 90 may be substantially the same as the intermittent transmission means 40 in the extruder driving mechanism 32, and therefore, a detailed description of the construction of the intermittent transmission means 90 itself will be omitted. The output shaft to be intermittently rotated of the intermittent transmission means 90 is drivingly connected to the input shaft of the gear pump 34. Thus, the rotating gear pair of the gear pump 34 is intermittently rotated.

The outlet of the gear pump 34 is connected to the inlet of a flow switching means 92. The flow switching means 92 has two outlets. One outlet is connected to the synthetic resin material cutting and transferring mechanism 24 via a flexible hose 94, and the other outlet is annexed to a recovery box 96. The flow switching means 92 may have a form disclosed in Japanese Laid-Open Patent Publication No. 178411/1991. In the flow switching means 92, a softened molten synthetic resin material discharged from the gear pump 34 is usually allowed to flow in the synthetic resin material cutting and transferring mechanism 24 via the flexible hose 94. However, for example, during an operation unstable period at the beginning of operation of the extruder 30 or when some trouble occurs in the container closure shell conveying means 2, the softened molten synthetic resin material discharged from the gear pump 34 is discharged in the recovery box 96. In the synthetic resin material cutting and transferring mechanism 24, the softened molten synthetic resin material allowed to flow via the flexible hose 94 is discharged, for example, from an annular discharge opening and cut off from the discharge opening and transferred to the inside surface of the top panel wall of the container closure shell. Such a synthetic resin material cutting and transferring mechanism 24 itself may have a form disclosed in, for example, Japanese Patent Publication No. 105613/1987. Hence, a detailed description of its construction will be omitted.

Figure 5:
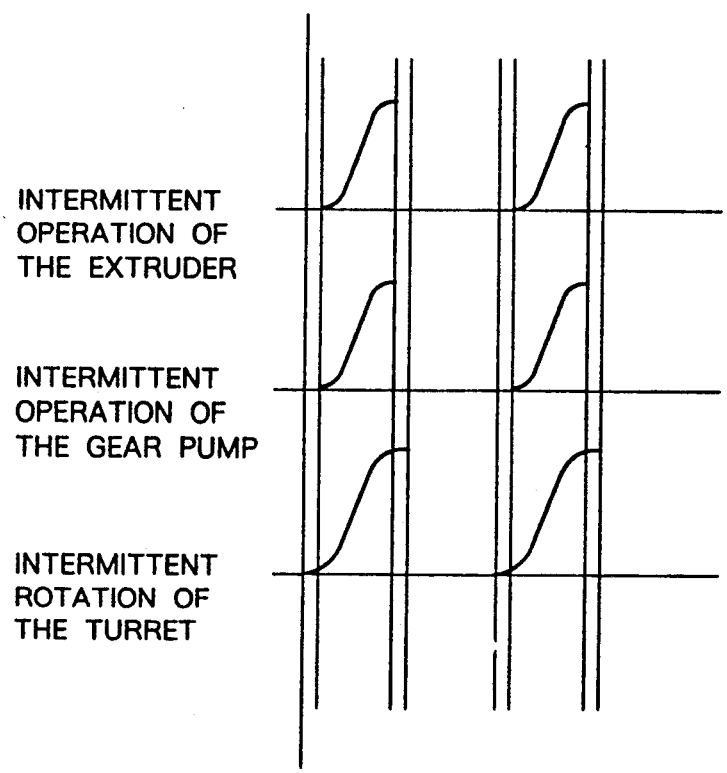
FIG. 5 is a diagram showing the relation between the intermittent rotation of the turret of a container closure shell conveying means and the intermittent operation of an extruder and a gear pump of a synthetic resin material feeding apparatus in the sealing liner forming system shown in FIG. 1.

FIG. 5 shows one example of the relation between the intermittent operation of the extruder 30 and the gear pump 34 in the synthetic resin material feeding apparatus 22 and the intermittent rotation of the turret 6 in the container closure shell conveying means 2. In the illustrated example, while the turret 6 in the container closure shell conveying means 2 is rotated, the extruder 30 and the gear pump 34 in the synthetic resin material feeding apparatus 22 are intermittently operated. Therefore, the softened molten resin material is caused to flow into the synthetic resin material cutting and transferring mechanism 24 and to flow out from its discharge opening. Preferably, the intermittent operation of the extruder 30 and the intermittent operation of the gear pump 34 are completely synchronized. While the rotation of the turret 6 of the container closure shell conveying means 2 is at a stop, namely while the container closure shells 28 accommodated in the accommodating pockets 8 of the turret 6 are stopped at the synthetic resin material feeding zone B and the synthetic resin material molding zone C, the operations of the extruder 30 and the gear pump 34 are stopped. During this time, in the synthetic resin material feeding zone B, the softened molten synthetic resin material is cut off from the discharge opening of the synthetic resin material cutting and transferring mechanism 24, and transferred to the inner surface of the top panel wall of the container closure shell 28, and thus the synthetic resin material is fed to the inner surface of the top panel wall of the container closure shell 28. In the synthetic resin molding zone C, the synthetic resin material existing in the inner surface of the top panel wall of the container closure shell 28 is compression-molded into a sealing liner of a required shape.

In the above example, the intermittent transmission means 40 and 90 are respectively annexed to the driving sources 38 and 88 in order to produce an intermittent rotation-driving function in the extruder driving mechanism 32 and the gear pump driving mechanism 36. If desired, a suitable electric motor or a pneumatic or hydraulic motor such as a stepping motor, itself, having an intermittent rotation-driving function may be used as the rotating driving sources 38 and 88.

In the present invention, the extruder (and the gear pump) can be intermittently operated in relation to the synthetic resin material cutting and transferring which is carried out intermittently as required. Accordingly, even when the softened molten synthetic resin material is fed intermittently in an annular form to the inner surface of the top panel wall of the container closure shells through the synthetic resin material feeding zone, the softened molten synthetic resin material as required can be formed in a sufficiently precisely controlled feed amount with a fully uniform state. Accordingly, a synthetic resin sealing liner can be stably formed as required on the inner surface of the top panel wall of the container closure shells.

The present invention has been described in detail with reference to the accompanying drawings on the preferred embodiment of the invention, but it should be understood that the present invention is not limited to such example and various modifications or changes are possible without departing from the scope of this invention.

What I claim is:

1. A synthetic resin material feeding apparatus comprising an extruder for extruding a synthetic resin material in the softened molten state and an extruder driving mechanism for rotating the rotating screw of the extruder, wherein the extruder driving mechanism has an intermittent rotation-driving function to intermittently rotate the rotating screw, a gear pump for receiving synthetic resin material extruded from the extruder, a gear pump driving mechanism for rotating the gear pump, said gear pump driving mechanism having an intermittent rotation-driving function to intermittently rotate the gear pump.

2. The synthetic resin material feeding apparatus of claim 1 wherein the extruder driving mechanism comprises a rotating driving source and an intermittent transmission means for converting the continuous rotating output of the rotating driving source into an intermittent rotation, and the intermittent rotating output of the intermittent transmission means is transmitted to the rotating screw.

3. The synthetic resin material feeding apparatus of claim 2 wherein the intermittent transmission means in the extruder driving mechanism comprises a crank arm reciprocatingly swivelled by a continuous rotation input and a one-way clutch which transmits the swivelling of the crank arm only when the crank arm swivels in a predetermined direction.

4. The synthetic resin material feeding apparatus of claim 3 wherein the crank arm is reciprocatingly swivelled through an angle, and the apparatus includes means for permitting adjustments of the angle through which the crank arm reciprocatingly swivels.

5. The synthetic resin material feeding apparatus of claim 1 wherein the intermittent rotation of the rotating screw by the extruder driving mechanism and the intermittent rotation of the gear pump by the gear pump driving mechanism are synchronized with each other.

6. The synthetic resin material feeding apparatus of claim 1 wherein the gear pump driving mechanism comprises a driving source, and an intermittent transmission means for converting the continuous rotating output of the driving source into an intermittent rotating output, and the intermittent rotating output of the intermittent transmission means is transmitted to the gear pump.

7. The synthetic resin material feeding apparatus of claim 6 wherein the intermittent transmission means in the gear pump driving mechanism comprises a crank arm reciprocatingly swivelled by a continuous rotating input and a one-way clutch which transmits the swivelling of the crank arm only when the crank arm is swivelled in a predetermined direction.

8. The synthetic resin material feeding apparatus of claim 7 wherein the crank arm is reciprocatingly swivelled through an angle, and the apparatus includes means for permitting adjustments of the angle through which the crank arm reciprocatingly swivels.

9. A sealing liner forming system for processing container closure shells having top panel walls with inner surfaces on which synthetic resin liners are to be formed, said system comprising a container closure shell conveying means for intermittently conveying container closure shells through a synthetic resin material feeding zone and a synthetic resin material molding zone, a synthetic resin material feeding apparatus for feeding a synthetic resin material in the softened molten state to the inner surface of the top panel wall of the container closure shells in the synthetic resin material feeding zone, and a molding apparatus for molding the synthetic resin material present on the inner surface of the top panel wall of the container closure shells into a sealing liner in the synthetic resin material molding zone, said synthetic resin material feeding apparatus including an extruder for extruding the synthetic resin material in the softened molten state and an extruder driving mechanism for rotating the rotating screw of the extruder, wherein said extruder driving mechanism has an intermittent rotation-driving function, and rotates the rotating screw intermittently.

10. The sealing liner forming system of claim 9 wherein the extruder driving mechanism includes a driving source and an intermittent transmission means for converting the continuous rotating output into an intermittent rotation, and the intermittent rotation output of the intermittent transmission means is transmitted to the rotating screw.

11. The sealing liner forming system of claim 10 wherein the intermittent transmission means in the extruder driving mechanism includes a crank arm which reciprocatingly swivels by a continuous rotating input and a one-way clutch which transmits the swivelling of the crank arm only when the crank arm swivels in a predetermined direction.

12. The synthetic resin material feeding apparatus of claim 11 wherein the crank arm is reciprocatingly swivelled through an angle, and the apparatus includes means for permitting adjustments of the angle through which the crank arm reciprocatingly swivels.

13. The sealing liner forming system of claim 9 further comprising a gear pump for receiving the synthetic resin material extruded from the extruder and a gear pump driving mechanism for rotating the gear pump, and the gear pump driving mechanism has an intermittent rotation-driving function and intermittently rotates the gear pump.

14. The sealing liner forming system of claim 13 wherein the intermittent rotation of the rotating screw by the extruder driving mechanism and the intermittent rotation of the gear pump by the gear pump driving mechanism are synchronized with each other.

15. The sealing liner forming system of claim 13 wherein the gear pump driving mechanism includes a driving source and an intermittent transmission means for converting the continuous rotating output of the rotating driving source into an intermittent rotating output, and the intermittent rotating output of the intermittent transmission means is transmitted to the gear pump.

16. The sealing liner forming system of claim 15 wherein the intermittent transmission means in the gear pump driving mechanism includes a crank arm which reciprocatingly swivels by the continuous rotating input, and a one-way clutch which transmits the swivelling of the crank arm only when the crank arm swivels in a predetermined direction.

17. The synthetic resin material feeding apparatus of claim 16 wherein the crank arm is reciprocatingly swivelled through an angle, and the apparatus includes means for permitting adjustments of the angle through which the crank arm reciprocatingly swivels.

18. The sealing liner forming system of claim 9 wherein the container closure shell conveying means includes a turret to be rotated intermittently.

* * * * *